US006932847B2

(12) United States Patent
Amendola et al.

(10) Patent No.: US 6,932,847 B2
(45) Date of Patent: Aug. 23, 2005

(54) PORTABLE HYDROGEN GENERATOR

(75) Inventors: Steven C. Amendola, Ocean, NJ (US);
Phillip J. Petillo, Ocean, NJ (US);
Stephen C. Petillo, Ocean, NJ (US);
Richard M. Mohring, East Brunswick, NJ (US)

(73) Assignee: Millennium Cell, Inc., Eatontown, NJ (US)

( * ) Notice: Subject to any disclaimer, the term of this patent is extended or adjusted under 35 U.S.C. 154(b) by 804 days.

(21) Appl. No.: 09/900,625

(22) Filed: Jul. 6, 2001

(65) Prior Publication Data

US 2003/0037487 A1 Feb. 27, 2003

(51) Int. Cl.[7] ................................................. C10J 3/20
(52) U.S. Cl. .................. 48/76; 48/61; 48/89; 48/118.5; 422/129
(58) Field of Search ............................... 48/61, 76, 89, 48/118.5; 422/129, 211, 222, 236, 237; 423/657, 658.2

(56) References Cited

U.S. PATENT DOCUMENTS

| | | | |
|---|---|---|---|
| 2,534,533 A | | 12/1950 | Schlesinger et al. |
| 3,210,157 A | | 10/1965 | Lewis et al. |
| 3,615,215 A | | 10/1971 | Von Dohren et al. |
| 4,155,712 A | | 5/1979 | Taschek |
| 5,104,635 A | * | 4/1992 | Kanada et al. ............. 423/584 |
| 5,372,617 A | | 12/1994 | Kerrebrock et al. |
| 5,429,886 A | * | 7/1995 | Struthers ................... 429/44 |
| 5,593,640 A | | 1/1997 | Long et al. |
| 5,804,329 A | | 9/1998 | Amendola |
| 5,817,157 A | | 10/1998 | Checketts |
| 6,187,465 B1 | * | 2/2001 | Galloway ................... 429/17 |

FOREIGN PATENT DOCUMENTS

| | | |
|---|---|---|
| EP | 1 067 091 | 10/2001 |
| WO | WO 98/30493 | 7/1998 |

OTHER PUBLICATIONS

Maurice E. Indig and Richard N. Synder, "Sodium Borohydride, An Interesting Anodic Fuel", Journal of the Electrochemical Society, vol. 109, pp. 1104–1106, Nov. 1962.
Brown et al. J.A.C.S. 84, pp 1493–1494, 1962.
Schlesinger et al. J.A.C.S. 75, pp 215–219, 1958.
Levy et al. Industrial & Engineering Chemistry, 52, No. 3, pp 211–214, 1960.
Kaufman et al. J. Chem. Soc., Dalton Trans, pp 307–313, 1985.
Amendola et al. Prep. Symp. Am. Chem. Soc. Fuel Div., 44 pp 864–868, 1999.
Amendola et al. Joint iInt. Meeting, The Electrochem. Soc./The Electrochem. Soc. of Japan, Abstract No. 423, Oct. 1999.
Amendola et al. The Electrochem. Soc., Abstract No. 545, May 1999.
Amendola et al. Joint Int. Meeting, 2000 Fuel Cell Seminar, Nov., 2000.
Amendola et al. Proc. Power Sources Conf. 2000, pp. 176–179, 2000.
Amendola, et al. Advances in Hydrogen Energy, Kluwer Academic/Plenium Publishers, pp 69–86, 2000.
Amendola et al. 200 Future Car Congress 2000–01–1541, pp. 1–3, 2000.
Amendola et al. International Journal of Hydrogen Energy 25, pp 969–975, 2000.
Amendola et al. Journal of Power Sources 85, pp 186–189, 2000.

* cited by examiner

*Primary Examiner*—Samuel M. Heinrich

(57) ABSTRACT

A hydrogen generation system includes a fuel container, a spent fuel container, a catalyst system and a control system for generating hydrogen in a manner which provides for a compact and efficient construction while producing hydrogen from a reaction involving a hydride solution such as sodium borohydride.

35 Claims, 9 Drawing Sheets

PORTABLE HYDROGEN GENERATOR

FIELD OF THE INVENTION

Hydrogen is a "clean fuel" because it can be reacted with oxygen in hydrogen-consuming devices, such as a fuel cell or combustion engine, to produce energy and water. Virtually no other reaction byproducts are produced in the exhaust. As a result, the use of hydrogen as a fuel effectively solves many environmental problems associated with the use of petroleum based fuels. Safe and efficient storage of hydrogen gas is, therefore, essential for many applications that can use hydrogen. In particular, minimizing volume and weight of the hydrogen storage system are important factors in mobile applications.

Several methods of storing hydrogen currently exist but are either inadequate or impractical for wide-spread consumer applications. For example, hydrogen can be stored in liquid form at very low temperatures. Cryogenic storage, however, only provides a volume density of 70 grams of hydrogen per liter, which is clearly insufficient for consumer applications. In addition, the energy consumed in liquefying hydrogen gas is about 60% of the energy available from the resulting hydrogen. Finally, liquid hydrogen is not safe or practical for most consumer applications.

An alternative is to store hydrogen under high pressure in cylinders. However, a 100 pound steel cylinder can only store about one pound of hydrogen at about 2200 psi, which translates into 1% by weight of hydrogen storage. More expensive composite cylinders with special compressors can store hydrogen at higher pressures of about 4,500 psi to achieve a more favorable storage ratio of about 4% by weight. Although even higher pressures are possible, safety factors and the high amount of energy consumed in achieving such high pressures have compelled a search for alternative hydrogen storage technologies that are both safe and efficient.

Other methods of hydrogen storage include the use of chemical compounds that either (i) chemically react with water or other species to generate hydrogen or (ii) reversibly adsorb and then release the hydrogen. However, these methods and compounds suffer from many deficiencies, which make them unsuitable for use in consumer applications. These deficiencies include, high cost, poor safety, poor hydrogen storage capacities, decreased reversibility, poor hydrogen generation capacities, poor control of hydrogen generation, and high system complexities.

In view of the above, there is a need for safer, more effective methods and assemblies for storing and recovering hydrogen. In addition, there is a need to meet the above requirements while minimizing overall system volume and weight.

OBJECTS AND SUMMARY OF THE INVENTION

It is an object of the present invention to provide a compact, safe and efficient system for storing and generating hydrogen. These and other objects of the invention will become more apparent from the detailed description and examples that follow.

A first embodiment of the present invention provides a hydrogen generator system having a first container, a second container, and a catalyst system connected to the first and second containers. A pumping system is provided for pumping fuel from one of the containers through the catalyst system. Either container can be a fuel container or a spent fuel container.

In another embodiment of the present invention, the catalyst chamber has a hydrogen generator catalyst for reacting with a fuel such as a hydride solution to create hydrogen.

In another embodiment of the present invention, a portion of one side of the first container is shared with a portion of one side of the second container thereby defining a shared partition. The shared partition can be flexible, such as by providing the shared partition with folding portions or telescoping portions.

In another embodiment, the hydrogen generator system is provided with a pressure switch for measuring the pressure within the spent fuel container. The pressure switch is in communication with the pumping system for controlling the pumping depending upon the measured pressure of the spent fuel container.

In another embodiment of the present invention, the hydrogen generator system is provided with a hydrogen container connected to the spent fuel container for receiving hydrogen gas byproduct created by the hydrogen generation process.

In another embodiment of the present invention, the hydrogen generator system is provided with a hydrogen container which is connected to the catalyst system for receiving hydrogen gas byproduct created by the hydrogen generation process.

In another embodiment of the present invention, the hydrogen generator system is adapted for a hydride solution such as a metal hydride solution.

In another embodiment of the present invention, the hydrogen generator system is adapted for a hydride solution such as a sodium borohydride solution.

In another embodiment of the present invention, the hydrogen generator system is provided with a spent fuel line wrapped around the outside of one of the containers. In an alternative embodiment of the present invention, the first container has a perimeter less than the perimeter of the second container, and the spent fuel line is wrapped around the portion of the second container.

In another embodiment of the present invention, an insulated area is provided to cover a portion of the second container and is interposed between the second container and the spent fuel line.

In another embodiment of the present invention, the hydrogen generator system is provided with the catalyst system and pumping system disposed between the first and second containers.

In another embodiment of the present invention, the hydrogen generator system is provided with a transportation cart having a frame, a back, at least one support band and a number of wheels. The back can be provided with a number of support struts, a number of vertical braces, and bands around the spent fuel tank to hold it to the hand truck and to act as a heat sink.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 8 is a cross-sectional view of an alternative configuration of the portable hydrogen generation.

Figure 1:
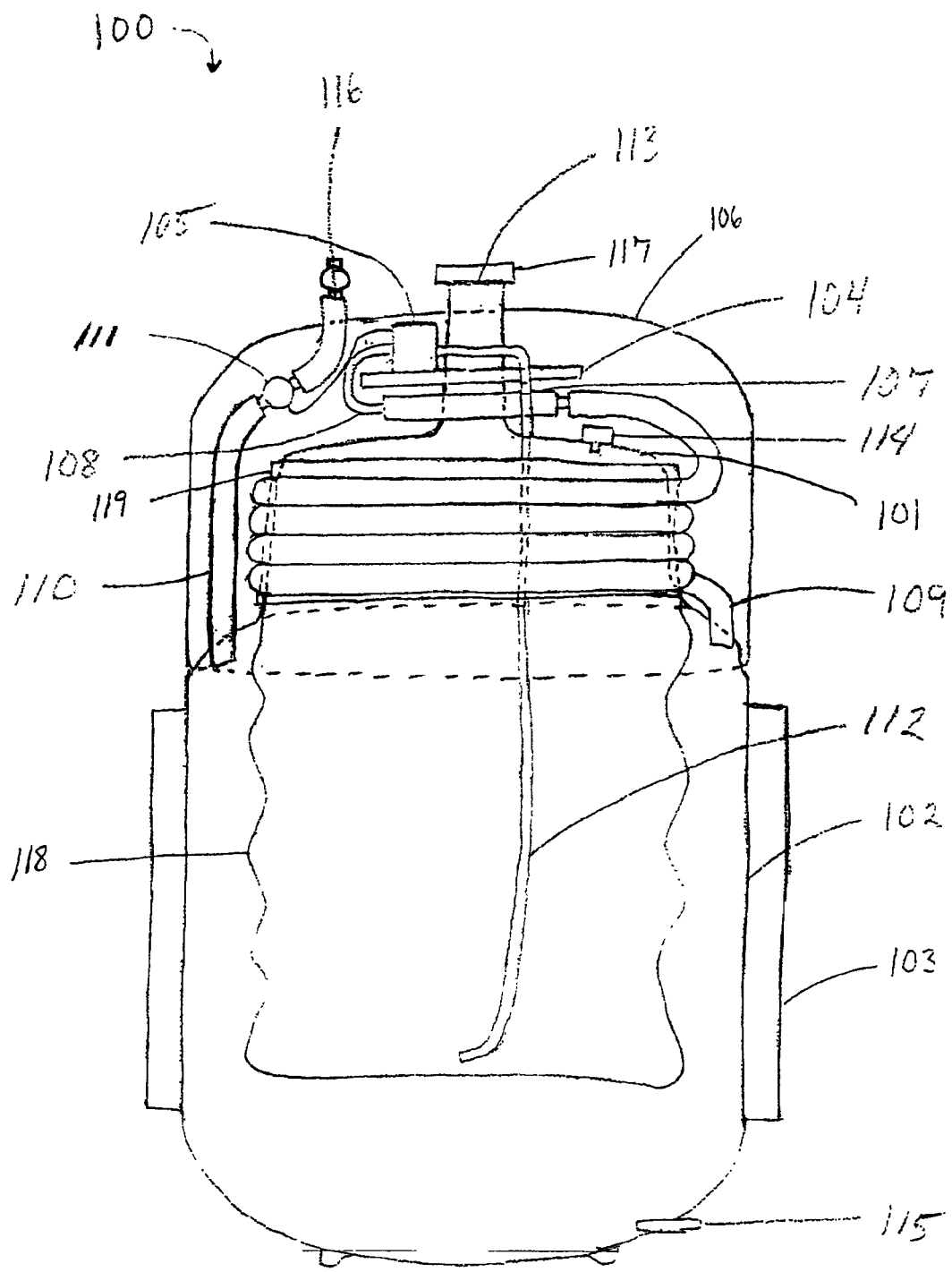
FIG. 1 is a cross-sectional view of a portable hydrogen generator according to the invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE INVENTION

FIG. 1 shows a cross sectional view of a portable hydrogen generator 100 illustrating one embodiment of the present invention. The portable hydrogen generator is comprised of a fuel container 101 for containing the fuel for the hydrogen generator and a spent fuel container 102 for receiving the resulting products from a hydrogen generation process.

The fuel used by the specific embodiment shown in FIG. 1 is a hydride solution and can be a stabilized metal hydride solution. A process for generating hydrogen from such a stabilized metal hydride solution is described in U.S. patent application Ser. No. 09/979,362 filed Jan. 7, 2000, for "A System for Hydrogen Generation" and is hereby incorporated by reference in its entirety. The specific embodiment of the invention described herein is adapted for the generation of hydrogen from a stabilized metal solution, such as sodium borohydride to produce hydrogen gas. Resulting products of the hydrogen generation process can include hydrogen gas, borate, and water among other things. It can be appreciated that the specific dimensions as well as operating temperatures and pressures of the apparatus can be modified and adapted according to the intended use of the apparatus and according to the specific metal hydride solution to be used without departing from the intended purpose of the invention. For example, although hydroxide can be used as a stabilizer, it can be appreciated that a less caustic stabilizer such as glycol can be used in the fuel which would allow a different choice of materials for components of the apparatus than specifically described herein.

The fuel container 101 and the spent fuel container 102 are preferably configured to provide an apparatus having a compact and efficient configuration. Accordingly, a portable hydrogen generator 100 according to the invention is shown in FIG. 1 having a fuel container 101 at least partially integrated with a spent fuel container 102 wherein the fuel container 101 has a flexible portion.

The fuel container 101 and spent fuel container 102 are fabricated as cylinders from material capable of withstanding elevated pressures and temperatures as well as caustic substances including the intended fuel and fuel byproducts. Specifically, the containers can be constructed of materials which can withstand temperatures from 0° F. to 320° F. and pressures greater than 50 psi or more. Depending on the type of system the hydrogen generation is to be used with, it can be appreciated that containers can be provided with air circulation ports to permit atmospheric air to freely pass around the spaces surrounding the pumping and catalyst systems.

The fuel container 101 is preferably provided with a flexible portion on one side of the fuel container 101. The flexible portion of the fuel container 101 also forms a portion of the spent fuel chamber. Thus, the shared flexible portion forms a flexible partition 118 separating the fuel to be contained in the fuel container 101 with the resulting products to be contained in the spent fuel container 102, and thereby provides the portable hydrogen generator 100 with a specially compact configuration. Thus, as fuel is used from the fuel container 101, the chamber defined by the interior of the fuel container 101 can be allowed to collapse due to less fuel being present in the fuel container 101. Concurrently, as fuel is used for hydrogen generation and resulting products are accumulated in the spent fuel container 102, the spent fuel chamber is permitted to expand into the space previously occupied by a portion of the collapsing fuel container 101.

The flexible partition 118 is preferably constructed of a flexible material which can withstand the expected temperatures and caustic characteristics of the fuel and resulting products. Furthermore, it is believed that the flexible partition is less subject to the high pressure requirements of the outer portions of the fuel and spent fuel containers 101, 102 since the relative pressure between the fuel chamber and spent fuel chamber is believed to be less. Nevertheless, to prevent rupturing of the flexible partition, the flexible partition is provided to withstand pressures up to 50 psi or more, for the embodiment shown in FIG. 1. Materials from which the flexible partition can be fabricated include, flexible elastomeric material such as nylon thermoplastics such as PEEK™, Peek, Polysolfoam, polyameride, flexible woven metal, as well as certain plastics, such as perfluoroalkoxy resins such as Chemfluor®, among other things.

The flexible partition 118 can be provided with a pleated or creased portion to facilitate the collapse of the fuel chamber 101 in an accordion-like manner. It can be appreciated that the position of the folded portions of the flexible partition, as well as the location of the flexible partition 118 between the fuel container 101 and spent fuel container 102 can be modified according to the specific configuration desired.

The fuel container 101 can be provided with an aperture for receiving a dip tub 112 for removal of fuel from the fuel container 101. The fuel container 101 can include a flexible portion at its bottom end and can have a fill aperture 113 for receiving fuel or fuel components among other things. The fill aperture 113 is preferably provided with a sealing cap 117 or cover to prevent the contamination of the fuel by foreign substances. The dip tube 112 can alternatively enter the fuel container 101 through the fill aperture 113.

The dip tube 112 can be fabricated from flexible or rigid material. Such rigid materials include stainless steel, nickel plated alloys, monel, hestoloy, ingonel, high temperature alloys, certain plastics, as well as certain composite materials such as epoxy, graphite fiber, spectra, aramid fibers such as NOMEX®, and KEVLAR® among other things.

Examples of flexible materials include flexible elastomeric material such as nylon, thermoplastics such as PEEK™, Peek Polysolfoam, polyameride, flexible woven metal, as well as certain plastics, perfluoroalkoxy resins such as Chemflour®, among other things. For a fuel container 101 having a flexible portion, the dip tube is preferably fabricated from a flexible material to accommodate any collapse of the flexible portion of the fuel container 101. The dip tube 112 is connected to the pump 105 at an exit end of the dip tube 112 and extends substantially to the bottom of the interior of the fuel container 101 whereby substantially all fuel can be withdrawn from the fuel container 101 from an entrance end of the dip tube 112. Where a dip tube 112 is formed of flexible material, the dip tube 112 can be provided with a weighted end to ensure that the entrance to the dip tube 112 remains at the bottom of the interior of the fuel container 101 and the entrance end of the dip tube 112 remains substantially submersed in the fuel.

In order to provide for equalization of pressure as fuel is removed from the fuel container 101, an air inlet aperture in the fuel container 101 can be provided. The air inlet aperture can be provided with an air filter 114 to prevent the fuel from becoming contaminated by the introduction of foreign substances. The air inlet aperture and air filter 114 can be provided in the sealing cap 117. The air filter 114 can be comprised of material such as stainless steel, polypropylene, or sintered metal.

The spent fuel container 102 is provided with an aperture proximate to its top end for receiving a spent fuel line 109 for filling the spent fuel chamber with resulting products, including a byproduct gas such as hydrogen. The spent fuel container 102 is also provided with an aperture proximate to its top end for receiving a hydrogen line 110. The hydrogen line 110 is provided to allow the release of hydrogen gas which can accumulate within the spent fuel chamber. The spent fuel container 102 can be provided with an aperture proximate to its bottom end for receiving a waste valve 115 for allowing the drainage of spent fuel and other byproducts from the spent fuel chamber.

It can be appreciated that the placement of the various apertures of the system such as the fill aperture, the dip tube aperture, hydrogen line aperture and waste valve aperture can be chosen according to the intended use and configuration of the hydrogen generator apparatus and still satisfy the intent of the invention. In other embodiments of the present invention, these apertures can be placed at other locations on the fuel container 101 and spent fuel containers 102 such that the apertures can remain proximate to a top side of the apparatus. For example, it is believed that placing these apertures at a top side of the apparatus can ensure that the resulting product in the spent fuel container 102 remain at the bottom of the spent fuel container 102 due to the influence of gravity and thus do not interfere with the release of hydrogen gas from the hydrogen line 110. Similarly, placing the fill aperture 113 at a top side of the fuel container 101 permits added fuel to accumulate at the bottom of the fuel container 101 while remaining away from the fill aperture 113. It can be appreciated that other solutions can be employed to satisfy the purpose of the invention, such as extending the hydrogen line within the spent fuel container 102 to a portion of the spent fuel chamber where hydrogen gas is expected to accumulate.

The spent fuel container 102 is provided with heat fins 103 positioned about the outer surface of the spent fuel container 102 to allow any heat built up within the spent fuel chamber to be conveyed away from the spent fuel chamber thereby cooling the spent fuel chamber and its contents. The heat fins 103 can extend along the outer surface of the spent fuel container 102 and can be welded or affixed to the outer surface of the spent fuel container 102 to allow heat to be dissipated from the spent fuel container 102 to the heat fins. The heat fins 103 are preferably fabricated from material having good heat conductive properties, such as copper metal, and can be formed as metal tubes or strips.

The portable hydrogen generator 100 is further provided with a pumping system and a catalyst system. The pumping system provides for the transfer of fuel from the fuel container 102 to the catalyst system when hydrogen generation is desired. In addition, the pumping system can be provided for removing fuel from the catalyst system when cessation of hydrogen generation is desired. The pumping system shown in FIG. 1 includes a pump 105 which can be supported by the fuel container 101 on a mounting platform 104 such as a disk. It is not intended that the pumping system and catalyst system be limited to being supported at a top side of the fuel container 101 as shown in FIG. 1. It can be appreciated that other positions for the pumping system and catalyst system are possible without departing from the intent and purpose of the invention of maintaining a compact, efficient apparatus. The pump 105 can draw fuel from the fuel container 101 via the dip tube 112 as described above.

Alternatively, the pumping system can be formed with a hand operated pump (not shown) for pumping fuel as well as a set of check valves to prevent the back flow of fuel into the fuel container 101. In addition, it can be appreciated that a hand pump can be used to start the generation of hydrogen which can be further perpetuated by the expected increase of pressure in the spent fuel chamber as resulting products are transferred to the spent fuel container 102. Thus, the added resulting materials can urge the collapse of the flexible partition 118 and with the resulting compaction of the fuel container 101 additional fuel can be further urged into the catalyst system. A self-perpetuated reaction can be controlled by the use of a control valve before the catalyst system, which control valve can be operated manually or by other means.

The portable hydrogen generator 100 is provided with a catalyst system, which includes a hydrogen generation catalyst which can be provided in a catalyst chamber 107. A suitable embodiment of a catalyst chamber 107 is described in U.S. patent application Ser. No. 09/979,363 filed Jan. 7, 2000, for "A System for Hydrogen Generation" and will be described in greater detail below. The catalyst chamber 107 is provided with a fuel line 108 for receiving fuel at an entrance end from the pump 105. The fuel line 108 is preferably fabricated from a material which does not conduct heat well and can withstand the caustic properties of the fuel being used. Examples of such material include polyvinylchloride, teflon, nylon, polyethylene, polypropylene, Chemflour, Peek™, polysulfone as well as certain gas, oil, and nuclear industry compliant hoses. An exit end of the fuel line 108 is connected to an entrance aperture of the catalyst chamber 107 for introducing fuel into the chamber to contribute to he reaction process. The entrance aperture of the catalyst chamber can be provided with a check valve or a control valve (not shown) to control any back flow of fuel or resulting products. During the reaction process, resulting products including hydrogen gas can be passed out an exit aperture of the catalyst chamber 107 to a spent fuel line 109.

A spent fuel line 109 is provided for transporting resulting products from the catalyst chamber 107 to the spent fuel container 102. During the reaction process in the catalyst chamber 107, the fuel and resulting products are heated by an exothermic reaction, and thus the resulting products exiting the catalyst chamber 107 from the exit aperture are expected to be at an elevated temperature. Depending upon the anticipated use of the hydrogen gas, cooling of the gas can be provided. When the intended use of the hydrogen favors a dry gas, cooling of the resulting products allows moisture to precipitate out into the spent fuel container 102. Certain applications of the hydrogen generator can also utilize a hot and moist hydrogen gas, under which circumstances cooling is not provided.

Figure 3:
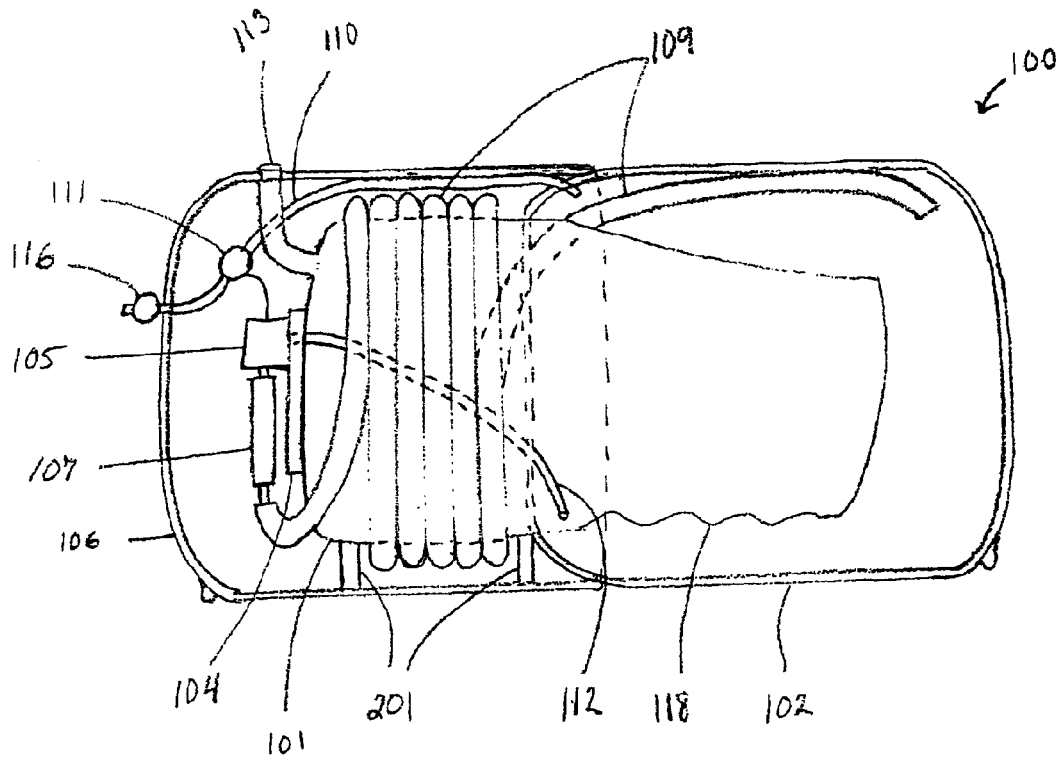
FIG. 3 is a cross-sectional view of the portable hydrogen generator positioned in a horizontal orientation.
Figure 5:
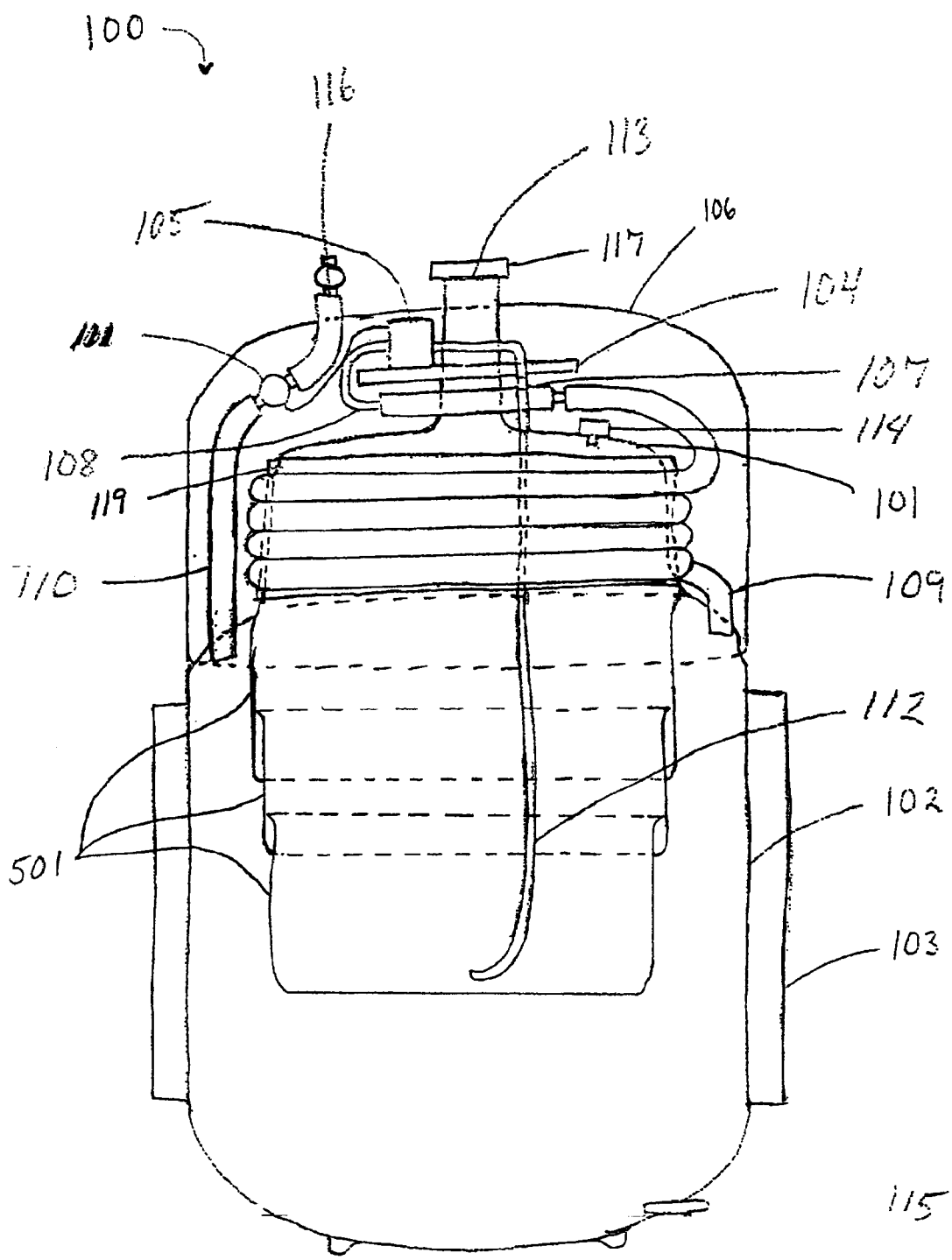
FIG. 5 is a cross-sectional view of the portable hydrogen generation having a flexible partition.

As illustrated in FIGS. 1, 3 and 5, when cool dry gas is desirable, the spent fuel line 109 can wrap around a portion of the fuel container 101 which is outside the spent fuel container 102 to facilitate the radiation of heat from the resulting products. Alternatively, the spent fuel line can be provided with a heat sink for transferring heat. The coiling of the spent fuel line 109 provides a solution which further maintains a compact and simple configuration for the portable hydrogen generator 100 while facilitating the cooling of the resulting products. The spent fuel line 109 is preferably fabricated from a material which can withstand the expected high temperatures and caustic characteristics of the resulting products. Such materials include stainless steel, nickel plated alloys, certain plastics, as well as certain composite materials such as epoxy, graphite fiber, spectra, aramid fibers such as NOMEX® and KEVLAR® among other things. It can be appreciated that such materials can be used to coat the inside surface of the spent fuel line 109 being formed of other materials. The spent fuel line 109 can also be provided with an outer layer or cover having favorable heat conductive properties, such as copper metal, and can be provided with fins or ridges for radiating heat. It can be appreciated that other forms of cooling can be employed to reduced the temperature of resulting material without departing from the purpose of the invention.

Insulation 119 can be provided to separate the spent fuel line 109 and the fuel container 101. Insulation 119 can also be provided in other locations such as between the catalyst chamber and the fuel container 101, between the spent fuel line 109 and the hydrogen line 110, as well as over portions of the spent fuel container 102. Such insulation 119 can be provided of materials including fluoropolymers such as nylon, Polysulfone, Teflon® or fiberglass. It can be appreciated that other forms of insulation can also be used which fulfill the purpose of the invention.

The spent fuel line 109 delivers resulting products to the spent fuel container 102 through an aperture in the spent fuel container 102. The aperture in the spent fuel container 102 is preferably positioned at an upper end of the spent fuel container 102 such that filling of the spent fuel container 102 does not interfere with the delivery of resulting products via the spent fuel line 109. It is also preferable to seal the junction where the aperture of the spent fuel container 102 and the spent fuel line 109 meet to prevent uncontrolled release of hydrogen gas from the spent fuel container 102.

The spent fuel line 109 can be provided with a flow restrictor (not shown) at the end of the spent fuel line 109 which enters the aperture of the spent fuel container 102. The flow restrictor can prevent the resulting products from exiting the spent fuel line 109 too quickly and thereby can ensure sufficient cooling of the resulting product by slowing the flow of the resulting products through the spent fuel line 109.

Before a process of producing hydrogen is commenced, the spent fuel container 102 can be purged of whatever atmospheric or other gases may be in the chamber to ensure that during the hydrogen production process the gas exiting from the waste chamber 102 via an entrance end of the hydrogen line 110 is substantially comprised of hydrogen gas. Alternatively, it can be appreciated that the spent fuel container 102 can be filled with an inert gas so as not to interfere with the intended use of the hydrogen, or the spent fuel container 102 can be partially evacuated before the hydrogen generation process is commenced, thereby reducing the need for an initial purging process. As the hydrogen production process fill the spent fuel container 102 with resulting products including hydrogen gas, the accumulation of these products increases the pressure within the spent fuel container 102. As pressure increases, hydrogen gas which as collected in the spent fuel container 102 can be released from the spent fuel container 102 through an entrance end of a hydrogen line 110. The hydrogen line 110 enters the spent fuel container 102 though an aperture in the spent fuel container 102 which is preferably sealed at the juncture between the aperture of the spent fuel container 102 and the hydrogen line 110. The aperture of the spent fuel container 102 through which the hydrogen line 110 enters is preferably provided at an upper end of the spent fuel container 102 to prevent the other resulting products which have accumulated in the spent fuel container from interfering with the release of hydrogen gas though the hydrogen line 110.

The hydrogen line 110 has an exit end from which the hydrogen gas can be released or collected. The hydrogen line 110 is preferably comprised of a material which can withstand the high temperatures and pressures which the hydrogen line 110 is expected to be subject to. Such materials include stainless steel, nickel plated alloys, certain plastics, as well as certain composite materials such as epoxy, graphite fiber, spectra, aramid fibers such as NOMEX® and KEVLAR® among other things.

The exit end of the hydrogen line 110 is provided with a control valve 116 which can control the release of hydrogen gas from the spent fuel container 102. The hydrogen line 110 can be provided with a pressure switch 111 which can control the operation of the pump 105 according to the desired operating pressures of the system. As pressure builds within the spent fuel container 102 and reaches an upper threshold pressure, the pressure switch 111 can shut off the pump 105 thereby preventing the further flow of fuel to the catalyst system and thereby slowing and stopping the buildup of pressure within the spent fuel container 102. For example, the pressure switch 111 can operate to shut off the pump 105 once a predetermined pressure is reached. The predetermined pressure should be within the operating range of the system and can be 32 psi. However, it can be appreciated that a hydrogen generation system according to the invention can also operate at different pressures according to the use of the system. As hydrogen gas is released though the control valve 116, pressure within the spent fuel container 102 is expected to drop. Once the pressure switch 111 detects that the pressure had dropped sufficiently, the pressure switch 111 can turn the pump 105 on again to restart pumping of the fuel into the catalyst system. For example, the pressure switch 111 can turn the pump 105 on again once the predetermined pressure is again detected. The pressure switch 111 can be preset to operate at a fixed pressure or the pressure at which the pressure switch 111 operates can be adjustable. In addition, the pressure switch 111 can be a diaphragm type switch or it can be a solid-state device and can control the pump 105 by either electrical or mechanical connections. The pressure switch 111 cycles the pump 105 to operate on and off until the fuel is exhausted. The system can be shut off manually or by a hydrogen detector that can shut off the pump 105 when it fails to detect hydrogen at a predetermined minimum threshold. Such a hydrogen detector can be a fuel cell which produces an electrical current in the presence of hydrogen gas. A timer and meter (not shown) can also be used to control the flow of fuel to the catalyst chamber and provide for a metered flow of fuel to be consumed by the hydrogen generator 100.

It can be appreciated that alternative configurations of the fuel container 101 and spent fuel container 102 can be used without departing from the content and purpose of the present invention.

Figure 2:
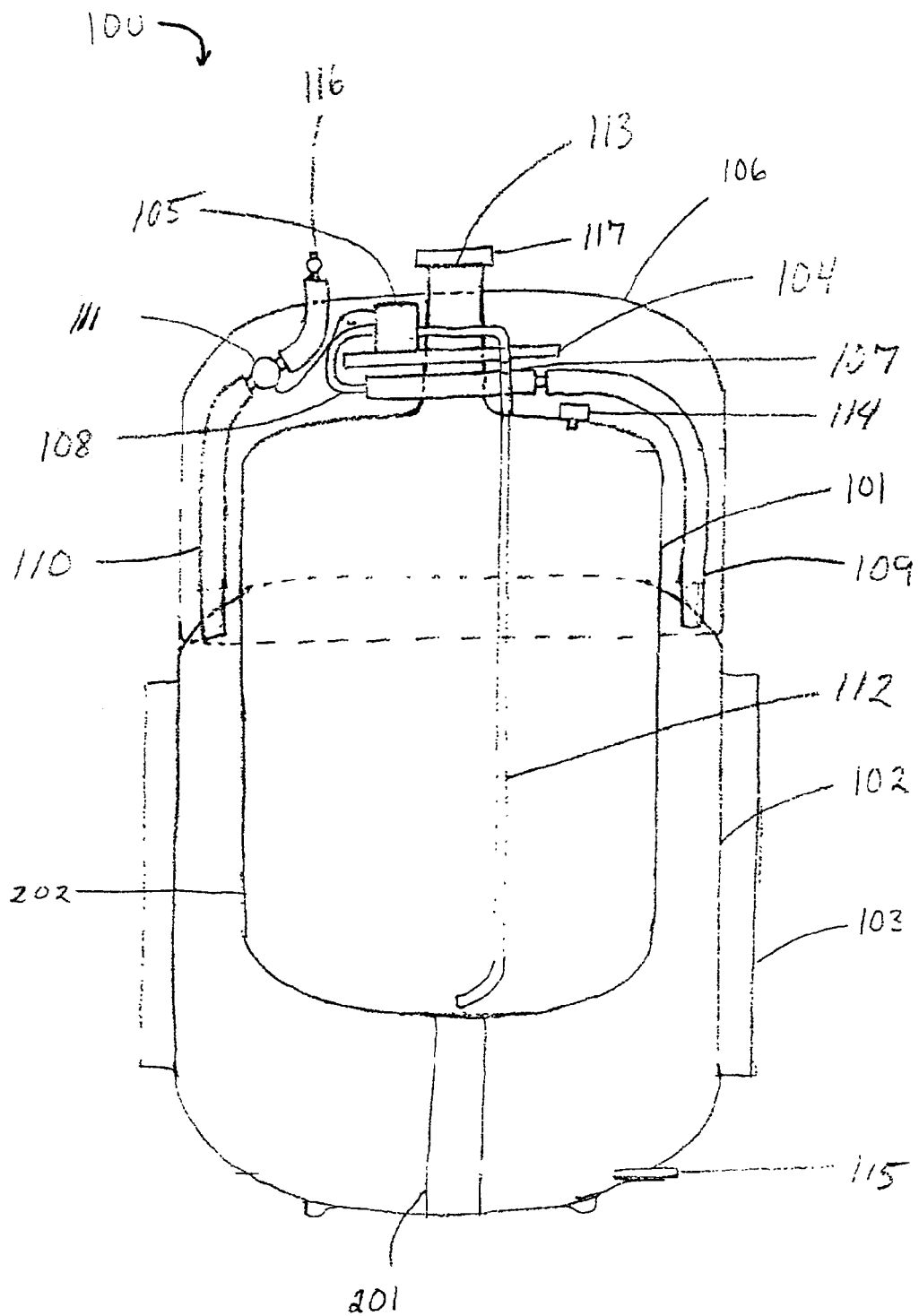
FIG. 2 is a cross-sectional view of the portable hydrogen generator having a rigid partition.

FIG. 2 shows a cross-sectional view of a portable hydrogen generator 100 substantially as described above. In addition, the portable hydrogen generator is provided with a rigid partition 202 for separating the fuel container 101 and the spent fuel container 102 . The rigid partition 202 can be comprised of the same materials comprising the fuel container 101 and the spent fuel container 102. These materials can include stainless steel, nickel plated alloys, certain plastics as well as composite materials such as epoxy, graphite fiber, spectra, aramid fibers such as NOMEX® and KEVLAR® among other things. In addition, a support 201 is provided for supporting the weight of the fuel container 101.

An alternative embodiment of the portable hydrogen generator according to the invention is shown in FIG. 3. In FIG. 3, the fuel and spent fuel containers 101, 102 can be placed side by side in a horizontal position while still maintaining a compact and efficient configuration. In a horizontal embodiment in which the fuel and spent fuel containers are placed side-by-side, the flexible partition 118 can be constructed to collapse in a substantially horizontal direction. In addition, the placement of the various apertures of the system, including the fill aperture, the dip tube aperture, the hydrogen line aperture and waste valve aperture are located to satisfy the intent of the invention described above and configured according to the particular embodiment shown in FIG. 3. For example, the spent fuel line 109 can be provided to extend within the spent fuel chamber so as to deliver resulting products to an area of the spent fuel chamber, where the initial delivery of resulting products does not interfere with gas collected by the hydrogen line 110.

Figure 4:
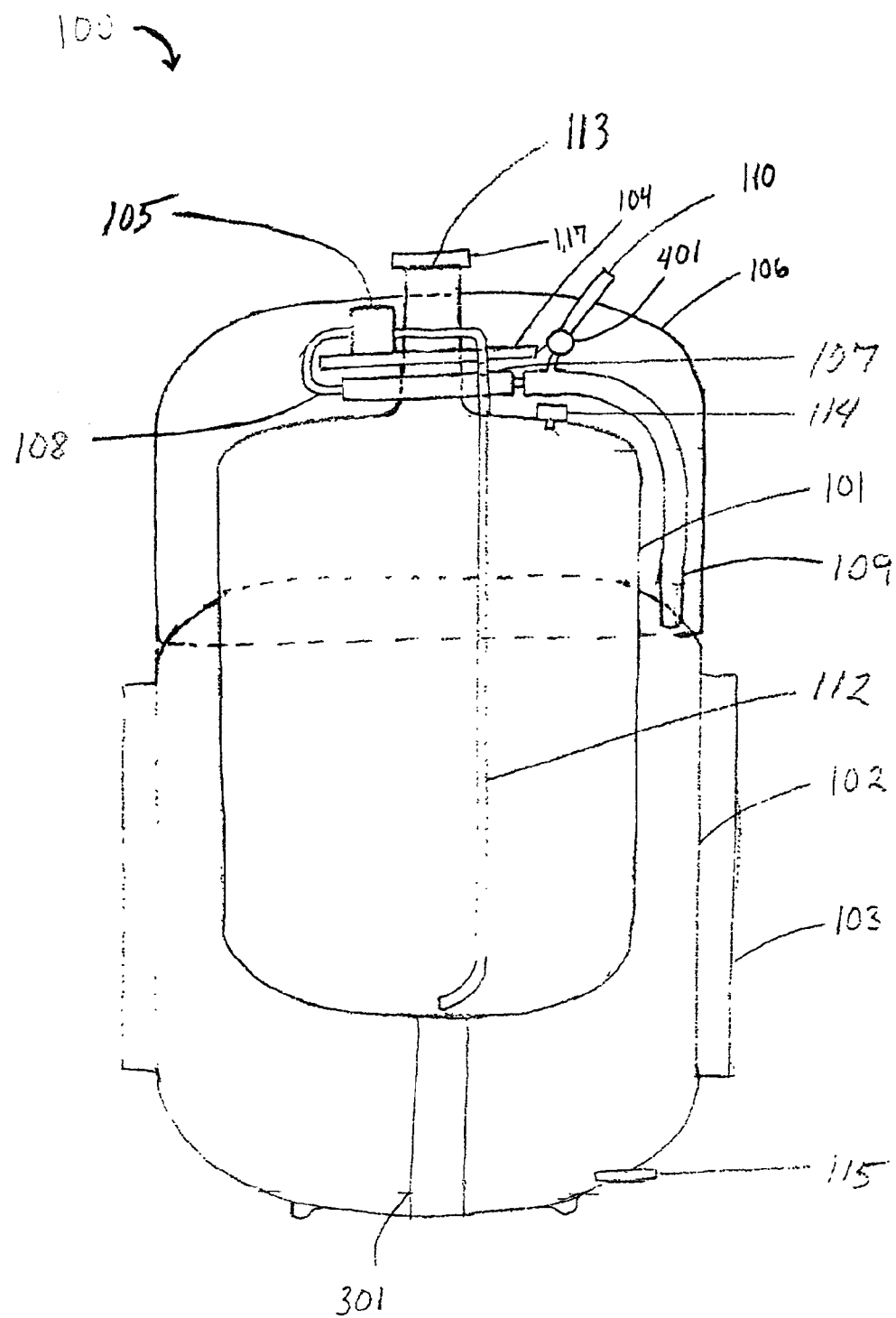
FIG. 4 is a cross-sectional view of the portable hydrogen generator having a hydrogen line extending from a catalyst chamber.

An alternative embodiment of the portable hydrogen generator according to the invention is shown in FIG. 4. A separating device 401 can be provided near the exit of the catalyst chamber 107 or anywhere along the spent fuel line 109 whereby hydrogen gas can be released into the hydrogen line 110. Alternatively, the separating device 401 can be provided by placing an additional exit aperture at the exit end of the catalyst chamber 107. The separating device 401 selectively passes hydrogen while excluding the other resulting products. Such a separating device 401 can be formed as a membrane having very small pores of a size to permit the release of hydrogen gas. Alternatively, the membrane can also be provided to release steam moisture depending upon the intended use of the released gases.

As shown in FIG. 5, the flexible partition 118 can alternatively be constructed from a number of partitions 501 or bellows which interact in a telescoping or folding manner to provide a compacting structure. The partition 501 are provided with seals (not shown) for sealing the partitions 501 of the flexible partition 118. Materials for such partitions 501 include the same materials from which the fuel and spent fuel containers can be comprised.

Figure 6:
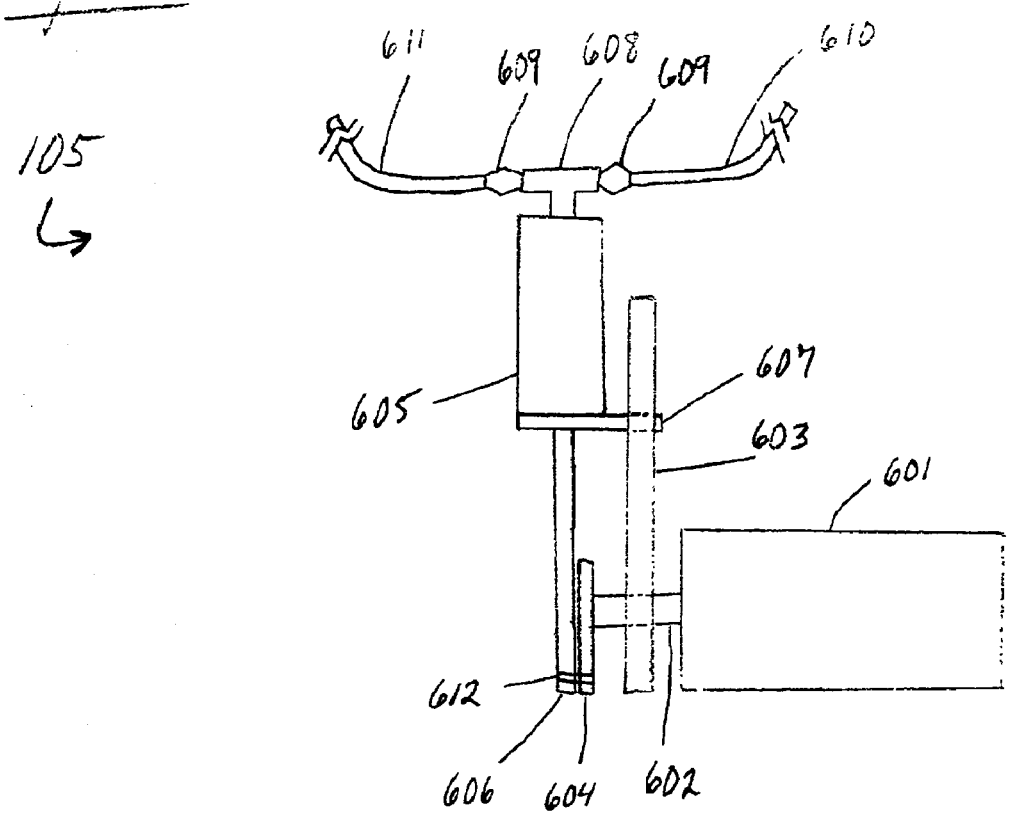
FIG. 6 is a side view of a pumping system for the portable hydrogen generation.

The pump 105 can be provided as shown in FIG. 6. The pump 105 can be provided with a drive assembly 601 which can be an electric motor for driving a drive shaft 602. The drive shaft 602 is attached to an crankshaft 604 which drives a piston rod 606 of a piston pump 605. The crankshaft 604 is rotatably connected to the piston rod 606 by a swivel 612 or other rotational connector means. The piston rod 606 is connected at one end to the piston pump 605 for providing lateral pumping motion. In this manner, the rotational motion of the crankshaft can be translated into a lateral motion of the piston rod 606 where a choice of piston pump 605 requires such a lateral motion for pumping. The piston pump 605 is flexibly connected to a base 603 by a pivot 607 or other flexible connection means. The piston pump 605 can be comprised of multiple cylinders, each having an individual piston rod 606. A gear reduction assembly [now shown] can be provided connected to the drive assembly 601 for providing more or less torque. It can be appreciated that other configurations are possible according to the specific choice of piston pump 605. Other forms of pumps include diaphragm pumps and compressors, as well as hand pumps.

The piston pump 605 can pump fluid by creating cyclical variations in pressure at a T-section 608. This fluid can be pumped from an inlet tube 610 to an outlet tube 611 which direction of flow can be directed by providing one or more check valves 609 which provide for one-way flow of fluid. The inlet tube 610 can be connected to the dip tube 112 and the outlet tube 611 can be connected to the fuel line 108. Bi-directional check valves 609 or solenoid valves can also be used which are capable of switching the direction of flow of the fluid which is to pass through the valves.

Figure 6A:
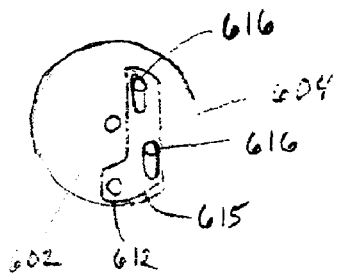

FIG. 6A shows an alternative embodiment of the crankshaft 604 for providing adjustable pump stroke. The crankshaft 604 can be provided as a plate having an adjustable swivel base 615 for the swivel 612. The adjustable swivel base 615 is provided with slots into which screws can be used to slideably adjust the swivel base 615 and for affixing the swivel base 615 to the crankshaft 604.

Figure 6B:
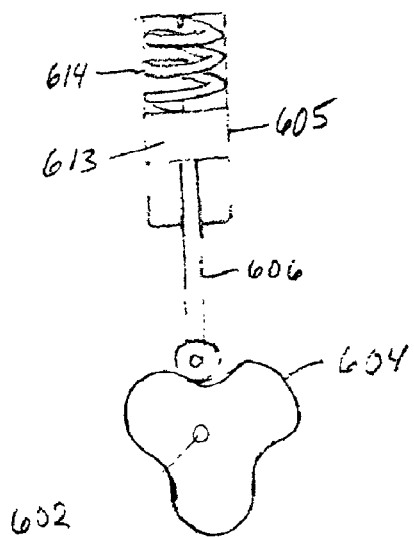

FIG. 6B shows an alternative embodiment of the crankshaft 604 being provided as a clover-leaf cam for driving the piston rod 606. The piston rod 606 is connected to a piston head 613 which is contacted with a spring device 614 for returning the piston rod 606 to a position against the clover-leaf cam on the return stroke.

The parts of the pump 105 are preferably fabricated from materials capable of withstanding the caustic properties of the fuel to be used. Preferably, the piston pump 605, piston shaft 606, T-section 608 and check valves are fabricated from plastics such as PEEK™ and Polysulfone.

Figure 7A:
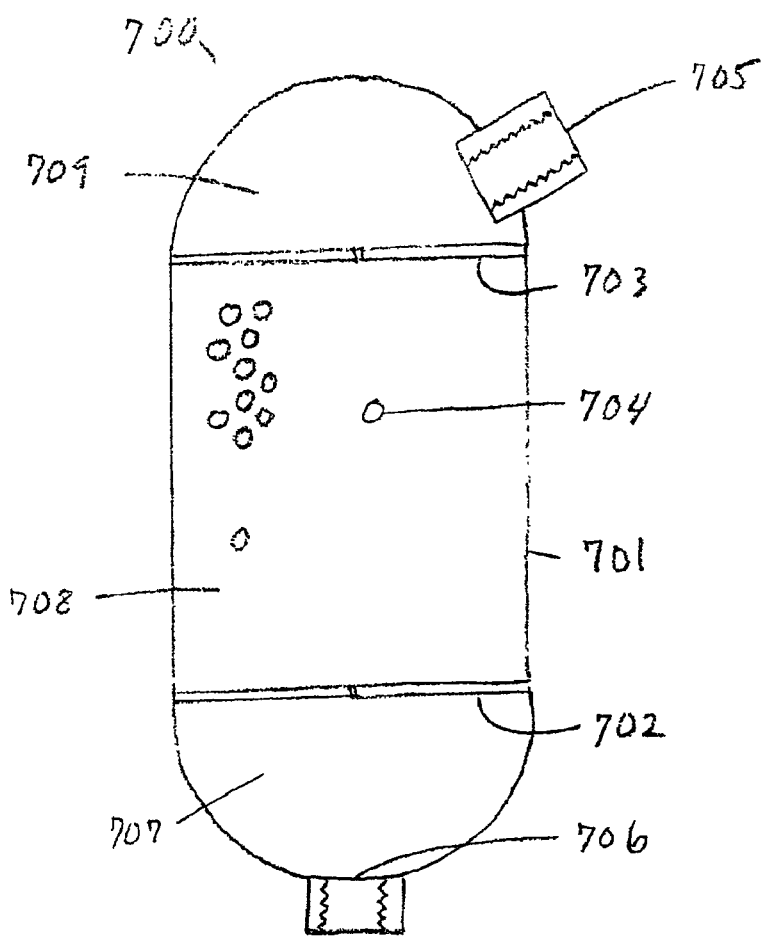
FIG. 7 is a cross-sectional view of a mist filter for the portable hydrogen generation.
Figure 7B:
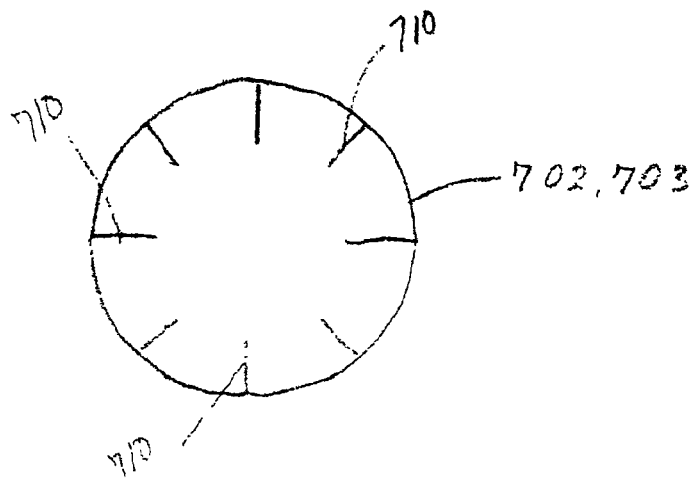
Figure 2:
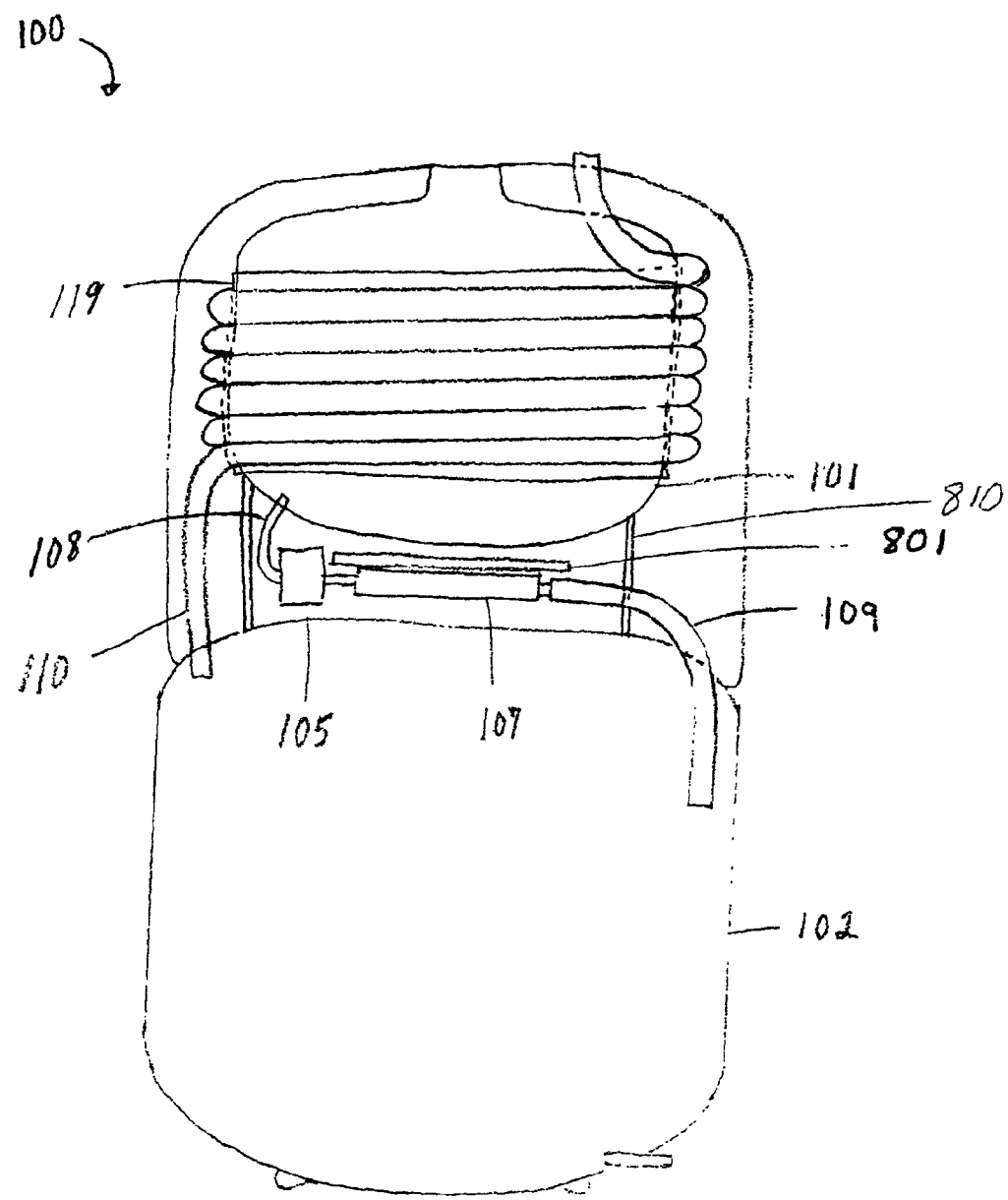

A mist filter 700, shown in FIG. 7A and FIG. 7B, can be provided for removing moisture and impurities from the gas leaving the hydrogen generator system. The mist filter 700 includes an outer casing 701 having at one end an inlet aperture 706 and at another end, an outlet aperture 705. The inlet aperture 706 and outlet apertures can be provided with a threaded area for receiving a threaded connector for attachment to the hydrogen line 110. Spray plates 702, 703 are provided within the mist filter 700 and are connected to the outer casing 701. The spray plates 702, 703 have a plurality of holes or slots 710 which can be provided at the periphery of the spray plates 702, 703 such that gas and moisture entering the mist filter 700 through the inlet aperture is not directly forced against the plurality of slots 710. By providing spray plates 702, 703 in the mist filter 700, three chambers can be formed: a gas-inlet chamber 707, a condensation medium chamber 708 and a gas outlet chamber 709. The condensation medium chamber 708 is provided with a condensation medium 704 which provides a large surface area without stopping the flow of the hydrogen gas. A suitable condensation medium 704 can include small stainless steel shot, as well as plastic, ceramic or other metallic media.

The inlet aperture 706 can be connected to the hydrogen line 110 for receiving moist gas. Moist gas which collects in the inlet chamber 707 is sprayed through the slots 710 of the first spray plate 702 into the condensation medium chamber 708. As the moist gas is sprayed into the condensation medium chamber 708, the moist gas impinges the condensation medium 704 causing moisture to condense over the surfaces of the condensations medium 704. This moisture can then flow back into the inlet chamber 707. This moisture can be collected from the mist filter 700 and returned to the spent fuel container 102 by the hydrogen line 110 or by a separate line. Moist gas is prevented from exiting the condensation medium chamber 708 by the second spray plate 703 which allows the passage of hydrogen gas into the outlet chamber 709. Hydrogen gas can then be passed through the outlet aperture 705. The mist filter 700 can be provided with a fine molecular sieve in addition or instead of either the first spray plate 702 or the second spray plate 703 or both. Alternative forms of filters can also be used such as coalescing filters.

Figure 9A:
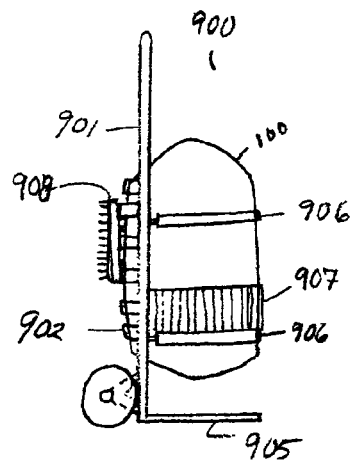
FIG. 9 is a side view of a transportation cart for the portable hydrogen generation.
Figure 9C:
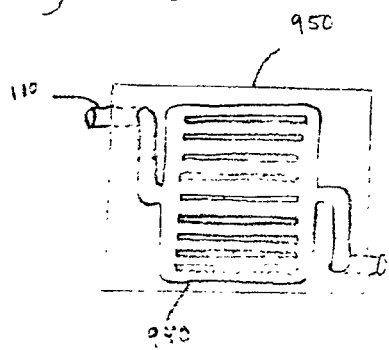
Figure 9B:
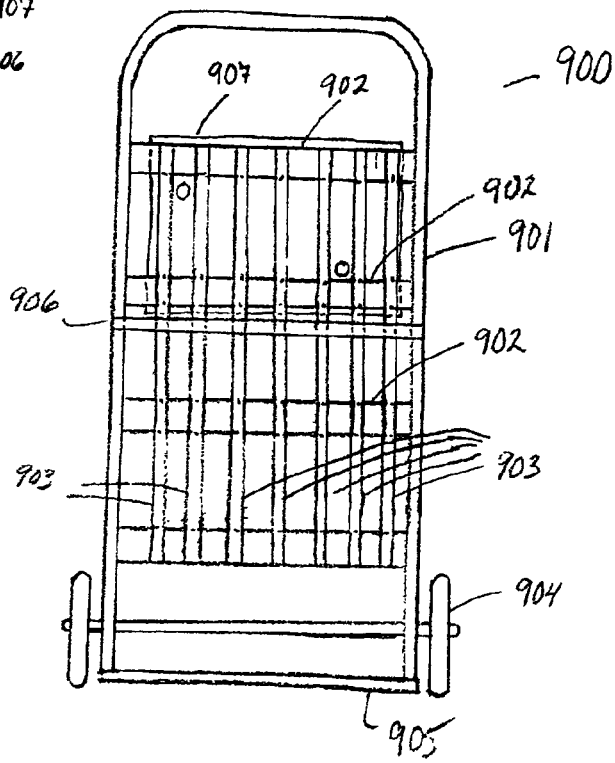

An alternative configuration of the portable hydrogen generator is shown in FIG. 8 in which the catalyst chamber 107 and pumping system 105 are provided between the fuel container 101 and spent fuel container 102. A heat shield 801 is positioned between the catalyst chamber 107 and the fuel container 101. Fuel from the fuel container 101 can be fed by gravity via a fuel line 108 to the catalyst chamber 107 or can be pumped by a pump 105 as described above. Alternatively, the fuel container can be pre-pressurized. A spent fuel line 109 is provided to deliver resulting products to the spent fuel container 102. Moist hydrogen can be collected from the spent fuel container 102 by a hydrogen line 110. The hydrogen line 110 can be coiled around the fuel container 101 to promote the release of heat from the moist hydrogen gas and to permit moisture to flow back into the spent fuel container 102. Alternatively, the hydrogen line 110 can be routed to pass the moist hydrogen gas through a heat exchanger 950. A heat exchanger 950 can be configured as shown in FIG. 9c in a parallel manifold array 940 of parallel tubes to promote the release of heat from the moist hydrogen gas to permit condensed moisture to flow more easily back into the spent fuel container. The heat exchanger can be provided within a heat sink 908, as shown in FIGS. 9a and 9b, or it can be provided separately. The parallel tubes in the heat exchanger 950 can be partially filled with material such as metallic or nonmetallic beads, fibers, wool or chip so as to aid in the condensation and coalescing process of moisture from the hydrogen steam. Insulation 119 can be provided between the hydrogen line 110 and the fuel container 101. Supports 810 are provided to support the fuel container 101 and provide an attachment to the spent fuel container 102.

A cooling fan and cooling coils (not shown) can be added to further cool the hydrogen generator 100.

The portable hydrogen generator can be provided with a transportation cart 900 which can also function as a heat sink as shown in FIGS. 9a and 9b. The transportation cart 900 is provided with a frame 901, wheels 904 and a back comprised of a plurality of support struts 902 connected to the frame 901. The support struts 902 are provided with a plurality of vertical braces 903 which can be shaped to conform to the shape of the hydrogen generator as shown in FIG. 9a thereby providing greater surface contact between the vertical braces 903 and hydrogen generator and thus facilitating the transfer of heat from the hydrogen generator to the transportation cart 900. Alternatively, or in addition, a heat exchanger 907 can be provided which can transfer heat through surface contact with the hydrogen generator 100 or by having contact with either the spent fuel line 109 or the hydrogen line 110. At least one support band 906 is provided connected to the transportation cart for supporting and holding the hydrogen generator to the transportation cart. Alternatively, or in addition, a heat sink 908 can be provided for transferring heat from the hydrogen generator 100 and which can provide additional support. The transportation cart 900 can be provided with a foot 905 to support the transportation cart 900 in a standing position. The transportation cart 900 can be fabricated from a heat conductive material having structural rigidity such as metals including steel or aluminum. Handles (not shown) connected to the frame can be provided with insulation to protect an individual from injury when handling the cart.

The hydrogen generation systems of the present invention are also provided with a catalyst chamber 107, which includes a hydrogen generation catalyst. The hydrogen generation catalysts used herein activate the reaction of the hydride solution with water to produce hydrogen gas. Preferably, these catalyst systems also include a containment system for the catalyst. A containment system, as used herein, includes any physical, chemical, electrical, and/or magnetic means for separating the hydrogen generation catalyst from the reacted metal hydride solution, e.g., mixture of $BO_2^-$ and $BH_4^-$.

Preferably, the catalyst facilitates both aspects of the reaction of the metal hydride and water: (i) the availability of a hydrogen site and (ii) the ability to assist in the hydrolysis mechanism, i.e., reaction with hydrogen atoms of water molecules. Metal hydride solutions are complex systems having multi-step reduction mechanisms. For example, borohydride has 4 hydrogen atoms and an 8-electron reduction mechanism. Thus, once a single hydrogen atom is removed from a borohydride molecule, the remaining moiety is unstable and will react with water to release the remaining hydrogen atoms. Catalysts that are useful according to the present invention include, but are not limited to, transition metals, transition metal borides, alloys of these materials, and mixtures thereof.

Transition metal catalysts useful in the catalyst systems of the present invention are described in U.S. Pat. No. 5,804,329, issued to Amendola, which is incorporated herein by reference in its entirety. Transition metal catalysts, as used herein, are catalysts containing Group IB to Group VIIIB metals of the periodic table or compounds made from these metals. Representative examples of these metals include, but are not limited to, transition metals represented by the copper group, zinc group, scandium group (including lanthanides), titanium group, vanadium group, chromium group, manganese group, iron group, colbalt group, and nickel group. Transition metal elements or compounds catalyze chemical reaction (1) and aid in the hydrolysis of water by absorbing hydrogen on their surface in the form of atomic H, i.e., $H^-$ or protonic hydrogen $H^+$. Examples of useful transition metal elements and compounds include, but are not limited to, ruthenium, iron, cobalt, nickel, copper, manganese, rhodium, rhenium, platinum, palladium, chromium, silver, osmium, iridium, borides thereof, alloys thereof, and mixtures thereof. Ruthenium and rhodium are preferred.

The catalysts used in the catalyst systems of the present invention preferably have high surface areas. High surface area, as used herein, means that the catalyst particles have small average particles sizes. For example, in a system in which the amount of a catalyst is to be minimized, such as in a system having a disposable catalyst, an average diameter can be less than about 100 microns, preferably less than about 50 microns, and more preferably less than about 25 microns thereby reducing cost by requiring less catalyst. The chemical reaction of borohydride and water in the presence of the catalyst follows zero order kinetics at all concentrations of borohydride measured, i.e., volume of hydrogen gas generated is linear with time. It is, therefore, believed that the reaction rate depends primarily on the surface area of the catalyst.

One method of obtaining catalyst particles with high surface areas is to use catalysts with small average particle sizes. Although catalyst with small average particle sizes are preferred, small particles can be swept away by the liquid metal hydride solution if they are small enough to pass through the containment system. Such deficiencies can be avoided by forming large aggregates of the small catalyst particles or by providing a filler to trap these particles. Large aggregate catalyst particles, as used herein, are masses or bodies formed from any small catalyst particles by well-known powder metallurgical methods, such as sintering. These metallurgical methods can also be used in making various convenient shapes. It is believed that these large aggregate catalyst particles maintain high surface areas because they are very porous.

Alternatively, the hydrogen generation catalysts can be formed into fine wires or a mesh of fine wires. These fine wires have a diameter of less than about 0.5 mm, preferably less than about 0.2 mm, and more preferably less than about 20 microns. In this embodiment, the fine wires of catalysts do not require a containment system, since the fine wires of catalyst will provide a sufficient surface area for reaction with the metal hydride solution without the particles being swept away by the liquid metal hydride solution.

Preferably, the catalyst systems also include a containment system for the catalyst. The containment system employs any physical, chemical, electrical, and/or magnetic means to separate the hydrogen generation catalyst from the reacted metal hydride solution. As would be evident to one skilled in the art, the need for a particular containment system will depend on the particular application of the system for hydrogen generation. For example, if an uncontrolled supply of hydrogen is needed and no reuse of the system is desired, no containment system is needed. The stabilized metal hydride solution and the hydrogen generation catalyst can be separately packaged and combined when hydrogen is needed. Even this system can be reusable, if the hydrogen generation catalyst can be later separated to allow regeneration of the reacted metal hydride solution. If a reusable and controllable system is desired, a containment system can be used to produce hydrogen when needed, as described below.

In one form, the containment system is a liquid and gas permeable mesh that traps or holds particulate catalysts, while allowing liquids and gases to pass freely through the containment system. In this embodiment the catalyst particles are larger than the spaces provided by the containment system. For example, metal hydride solution can flow into the containment system to react with the catalyst, while oxidized metal hydride, hydrogen gas, and unreacted metal hydride can easily pass out of the containment system. Alternatively, the containment system containing the catalyst can be lowered into the metal hydride solution when hydrogen is needed.

In this embodiment, the containment system is a porous or mesh material, which is preferably stable in the metal hydride solution. Porous or mesh materials can be formed into any configuration known in the art, which would keep the catalyst particles in a confined area while allowing entry and egress of liquids and gases. For example, a pouch or "tea bag" configuration can be used to encapsulate the catalyst particles, while allowing metal hydride solution and hydrogen gas to flow freely there through. Alternatively, The catalyst particles can be encapsulated in a removable tube or cylinder, wherein the ends of the cylinder are covered with the porous or mesh material. Porous or mesh material that are useful herein include ceramic, plastic, polymers, nonwovens, wovens, textiles, fabrics, carbons, carbon-fibers, ion exchange resins, metals, alloys, wires, meshes, and combinations thereof. Typically, the porous or mesh material is in the form of a sheet. Nonlimiting examples of porous or mesh material include nylon screens and stainless steel screens as well as nickel monel.

In another embodiment, separately packaged metal hydride solution and hydrogen generation catalyst can be combined when hydrogen is needed. Upon completion of the reaction, a containment system can then remove the catalyst by any known separation technique, such as centrifugation, precipitation, filtration, electrophoresis, and electromagnetism. For example, metallic hydrogen generation catalysts can be separated by employing a containment system that has a magnetic element. Nonlimiting examples of metallic hydrogen generation catalysts include iron, cobalt, nickel, and borides thereof. Alternatively, the mixture of catalyst and reacted metal hydride can be flushed out and later separated by a commercial processing center, which would recover the catalyst and regenerate the metal hydride solution.

In another embodiment, a contained high surface area catalyst can be obtained by attaching or binding the transition metal catalysts to a suitable substrate. The term "contained high surface area catalyst," as used herein, means that the catalyst is inherently maintained in a containment system and not free to migrate by itself, e.g., is attached to a substrate. In this embodiment, the metal hydride solution can pass over and/or through the substrate to react with the bound catalyst. Thus, hydrogen production can be controlled by either contacting or separating the bound catalyst from the metal hydride solution. If the substrate is in particulate form, a further containment system, as described above, is preferred to encapsulate the supported catalyst. For example, high surface area transition metal particles can be dispersed onto a solution cast film. Many substrates (e.g., ion exchange resins and plastics) can be dissolved into a solvent to form a solution or dispersion. The transition metal particles are then added. A solution cast film can be obtained by evaporating the solvent. The transition metal can be added in its salt or metal form and reduction steps can be taken if appropriate, as discussed below.

In a further example, a contained high surface area catalyst can be obtained by binding or entrapping a transition metal catalyst onto and/or within a porous or nonporous substrate by chemical means. By porous it is meant that the material is liquid and gas permeable. Generally, this process includes (i) dispersing a solution having a transition metal ion onto and/or within a substrate by contacting the solution with the substrate, and (ii) reducing the dispersed transition metal ions to the neutral valence state of the transition metal, i.e., metallic form. Without wanting to be limited by any one theory, it is believed that this unique process binds and/or entraps transition metal catalyst at a molecular level onto and/or within the substrate. These steps can also be repeated to obtain layers of transition metal molecules bound onto and/or entrapped within the substrate. High surface area substrate bound catalysts can be provided as a porous substrate having an average diameter of less than about 50 microns. Nonlimiting examples of porous substrates include ceramics and ionic exchange resins. Nonlimiting examples of nonporous substrates include metals, wire, metallic meshes, fibers and fibrous materials, such as monofilaments, threads and ropes fabricated from plastics, nylon, spectra, and aramid fibers such as NOMEX® and KEVLAR®.

Transition metal ion, as used herein, means an anion, a cation, an anion complex or a cation complex of a transition metal that is described above. Transition metal ions can be obtained from dissolving salts of transition metals, which are readily available from commercial manufacturers, such as Alfa Aesar Company and Aldrich Chemical Company. The transition metal salts may be dissolved in any solvent, typically water. The reducing agent can be any material or compound that is capable of reducing the transition metal ion to its neutral valence state. Nonlimiting examples of reducing agents include hydrazine, hydrogen gas, glucose hydroxylamine, carbon monoxide, dithionite, sulfur dioxide, borohydride, alcohols and mixtures thereof. Typically, most transition metals that catalyze metal hydrides, such as borohydride, can also be reduced by the same metal hydrides. For example, borohydride is a suitable reducing agent.

Nonlimiting examples of suitable substrates include ceramics, plastics, polymers, glass, fibers, ropes, nonwovens, wovens, textiles, fabrics, the many forms of carbon and carbon-fibers, ion exchange resins, metals, alloys, wires, meshes, and combinations thereof. Nonlimiting examples of ceramic substrates with various pore sizes include metal oxides, zeolites, perovskites, phosphates, metal wires, metal meshes, and mixtures thereof. Specific examples of suitable substrates include, but are not limited to zirconium oxides, titanium oxides, magnesium oxides, calcium oxides, zeolites, cationic exchange resins, fibrous materials, nonwovens, wovens, aramid fibers such as KEVLAR® fibers, polytetrafluoroethylene (PTFE) polymers, and combinations thereof. Since metal hydride solutions can have a high pH, substrates that do not dissolve or react with caustics are preferred. Also preferred are porous substrates with effective surface areas of greater than about 50 $m^2/g$ or nonporous substrates with an average diameter or less than about 50 microns.

When the substrate is in the form of beads, it is preferable to have the beads in a containment system, as described above, wherein the average diameter of the beads is greater than the spaces of the containment system. Furthermore, if the substrate has a surface treatment, such treatments can be removed by appropriate methods, such as by boiling or applying a solvent. For example, substrates treated with wax can be boiled. Alternatively, the wax can be removed by soaps such as acetone. Similarly, the starch on textiles can be removed by boiling in water.

The substrates, except for the ion exchange resins described below, can be treated with the catalyst in the following manner. The substrate is first soaked in a solution containing the transition metal salt, e.g., ruthenium trichloride. Solutions having concentrations close to saturation are preferred. This step disperses the transition metal salt into and/or onto the substrate. The treated substrate is then dried, typically with heat. Optionally, the treated substrate can be filtered before being dried. Note that the treated substrate is not rinsed. It is believed that the drying step promotes absorption of the transition metal ions onto and/or within the substrate by removing the solvent. The dry, treated substrate is then subjected to a solution containing a reducing agent, such as sodium borohydride, at a concentration sufficient to provide complete reduction, e.g., 5% by weight of sodium borohydride. Although this step can be conducted at room temperature, it is preferred to reduce the absorbed transition metal ions at an elevated temperature, e.g., greater than about 30° C., to increase the reduction rate. It is believed that the reduction step converts transition metal ions into its neutral valence state, i.e., the metallic state. After rinsing with water, the substrate is ready for use as a catalyst in the reaction of the metal hydride and water to produce hydrogen gas. The method can be repeated to obtain a desired loading of transition metal onto and/or within the substrate.

This method to obtain a contained high surface area catalyst can also be adapted to utilize chemical vapor deposition technology (CVD) by forming a transition metal complex that can be evaporated, i.e., boiled or sublimed, in a vacuum. The transition metal complex includes a transition metal ion, as described above, and a chemical vapor deposition complexing compound. Since the substrate is cold, the transition metal complex will recondense onto the substrate. Any suitable substrate, as described above, can be used. Any suitable chemical vapor deposition complexing compound that is known in the art can also be used. Nonlimiting example of metal complexes useful for chemical vapor deposition are metal diketonates such as Ru(acac) or Co(acac)$_3$ and metal alkoxides such as Ti(OiPr)$_4$ (acac=acetylacetonate; OiPr=isopropoxide). The transition metal complex that is deposited on the substrate can then be reduced by any of the above described reducing agents.

Alternatively, this method can be adapted to utilize electroplating techniques, i.e., electroplating a conductive substrate in a solution having a transition metal ion. Useful transition metal ions are described above. The transition metal can be electroplated onto a conductive substrate, such as nickel or stainless steel fine wire, screens comprising such fine wires, or metallic sheets. Typically, such fine wires can have an average diameter of less than about 20 microns, preferably less than about 10 microns, and more preferably less than about 2 microns.

In one preferred mode of electrochemical plating, a rough coating is obtained instead of the typical smooth or "bright coatings." Without wanting to be limited by any one theory, it is believed that these rough coatings have a high surface area. These rough coatings are often black in color, and are typically referred to in the art of electrochemical plating by the element name followed by the word "black," e.g., platinum black or ruthenium black. Most of the transition metals described above can be coated as "transition metal blacks." The exact conditions may vary between the elements, but the common parameter is application of a varying voltage during the plating process. "Varying voltage" means that the voltage is changed, alternated, stepped up, or stepped down in a cyclic or noncyclic manner. For example, a DC voltage can be turned on or off over time. Alternatively, the current can be periodically reversed, or the voltage may be switched from a lower to higher voltage and then back to the lower voltage. It is also common to superimpose an AC signal onto a DC source.

In still another example, this method to obtain a contained high surface area catalyst can also be adapted to utilize sputter deposition technology, e.g., physical vapor deposition, which is well known to those skilled in the art of surface coating technology. In sputter deposition, atoms of a metal surface are vaporized by the physical ejection of particles from a surface induced by momentum transfer from an energetic bombarding species, such as an ion or a high-energy neutral atom, preferably an ion or atom from one of the inert noble gases. The target atoms evaporate into the vacuum chamber and then condense on the substrate to form a thin film. Typically, the substrate is mounted in a sputter chamber, with one side facing up or down toward a hydrogen generation catalyst target. After evacuating the chamber, an inert gas, such as argon, is used to backfill the chamber to a pressure from about 10 to 50 millitorr (from about 1.3 to about 6.7 Pa). The sputtering process is initiated by applying a high voltage between the target and the chamber wall. The sputtering process is continued for an amount of time (typically a few minutes but can range from less than about a minute up to about a few minutes) according to the desired thickness of the hydrogen generation catalyst. Upon completion of the sputtering, air is readmitted into the chamber to remove the coated substrate.

While most of these substrates simply absorb the solution of transition metal salts, ion exchange resins offer some surprising and interesting characteristics. Ion exchange resins are porous polymeric materials having active groups at the end of the polymer chains. Typically, polymers used in ion exchange resins include, but are not limited to, polystyrene, epoxy amines, epoxy polyamines, phenolics, and acrylics. Ion exchange resins are classified into anionic exchange resins and cationic exchange resins. These resins are commercially available as beads, typically having particle sizes from about 20 mesh to about 100 mesh. The resins are also available as sheets and can be fabricated into any shape desired.

Anionic exchange resins attract anions because the active groups at the ends of the polymers have positive charges. Nonlimiting examples of positively charged active groups include a quaternary ammonium, tertiary amine, trimethyl benzyl ammonium, and/or dimethyl ethanol benzyl ammonium. Commercial anionic exchange resins are typically supplied in the Cl$^-$ or OH$^-$ form, i.e., easily replaceable chloride ions or hydroxide ions are bound to the active groups having positive charges. Commercially available anionic exchange resins include, but are not limited to, A-26, A-36, IRA-400 and IRA-900, manufactured by Rohm & Haas, Inc., located in Philadelphia, Pa.; Dowex 1, Dowex 2, Dowex 21 K, Dowex 550A, Dowex MSA-1, and Dowex MSA-2, manufactured by Dow Corporation; Duolite A-101 D, Duolite A-102 D, and Duolite A-30 B; and Ionac A-540, Ionac A-550, and Ionac A-300.

Cationic exchange resins attract cautions because the active groups at the ends of the polymers have negative charges. Nonlimiting examples of negatively charged active groups include sulfonic acid, carboxylic acid, phosphonic acid, and/or aliphatic acid. Commercial cationic exchange resins are typically supplied in the Na$^+$ or H$^+$ form, i.e., easily replaceable sodium or hydrogen ions are bound to the active groups having negative charges. Commercially available cationic exchange resins include, but are not limited to, Nafion resins, manufactured by Dupont Corp., located in Wilmington, Del.; IRA-120 and Amberlyst 15 manufactured by Rohm & Haas, Inc., located in Philadelphia, Pa.; Dowex 22, Dowex 50, Dowex 88, Dowex MPC-1, and Dowex HCR-W2 and Dowex CCR-1, manufactured by Dow Corporation; Duolite C-3, Duolite ES-63, and Duolite ES-80; and Ionac 240.

Anionic exchange resin beads are treated with the catalyst in the following manner. A transition metal salt is dissolved in an acid having the corresponding anion that can form an anionic complex of the transition metal. For example, ruthenium trichloride can be dissolved in hydrochloric acid to form chlororuthenic acid, wherein the ruthenium is contained in an antionic complex, i.e., $[RuCl_6]^{-3}$. Typically, the anionic complex of a transition metal is characterized by the chemical formula $[M^{y+}X_6]^{(y-6)}$, wherein M is a transition metal, y is the valence of the transition metal, and X is an anion with a single negative charge. The concentration of the transition metal solution can be varied accordingly, but a concentration close to saturation is preferred. The acidic solution containing the anionic transition metal complex can then be exchanged onto the anionic exchange resin beads by contacting the anionic exchange resin beads with the anion transition metal solution. Typically, this is done either by soaking the beads in the solution or dropwise adding the solution onto the beads. Without wanting to be limited by any one theory, it is believed that the anion associated with the active group of the resin is exchanged with the anionic transition metal complex. Exchange, as used herein, means that the ion associated with the active groups of the ion exchange resin, e.g., the chloride, is substituted with the ion of the transition metal. As a result, a very strong chemical (ionic) bond is formed between the anionic transition metal complex and the active group of the ion exchange resin at each active group site.

Upon exposure to a reducing agent, such as sodium borohydride, the anionic transition metal complex is reduced at the exchange site to its neutral valence state, i.e., the metallic state. The result is a distribution of transition metal catalyst molecules in and/or on the resin. The process may be repeated to obtain higher metal content if desired, because the reduction step restores the anion at the positively charged active groups of the exchange resin. It is believed that the restored anion associated with the active group is either the anion that had been formerly associated with the transition metal, e.g., chloride from the $[RuCl_6]^{-3}$, or the reducing agent. After rinsing with water, the treated anionic exchange resin beads are ready for use as a catalyst in the reaction of the metal hydride and water to produce hydrogen gas.

Catalyst treatment of cationic exchange resin beads require a slightly different procedure, because the affinity of the cation transition metal complexes for the cationic exchange resins is much weaker than the affinity of anion transition metal complexes for the anionic exchange resins. Despite this additional complication, cationic exchange resins are particularly useful because they can typically withstand harsher environments, especially higher temperatures.

Although transition metals are formally written in their cationic valence state, e.g. $Ru^{+3}$, transition metals form anionic complexes in the presence of common complexing ions, such as chloride. Such anionic transition metal complexes would have little or no attraction for a cation exchange resin bead having negatively charged active groups. This can be avoided by using transition metal salts having non-complexing anions. Non-complexing anions, as used herein, refers to ions that are typically very large and contain a central atom that is fully coordinated, thereby leaving little activity for further complexing with the transition metal. Nonlimiting examples of non-complexing anions of this type include perchlorate ($ClO_4^-$), hexafluorophosphate ($PF_6^-$), and tetrafluoroborate ($BF_4^-$), and mixtures thereof. Transition metal salts having non-complexing anions can be obtained via a precipitation reaction with a transition metal salt and an equimolar amount of a compound having a non-complexing anion. The compound having the non-complexing anion is chosen so that the anion from the transition metal salt precipitates out with the cation associated with the non-complexing anion. For example, a solution of ruthenium trichloride can be reacted with an equimolar amount of silver perchlorate solution. The chloride will precipitate out of solution as silver chloride and leave ruthenium perchlorate in solution. Since perchlorate ions can not complex like chloride ions, only the ruthenium will be hydrated in the cationic form, i.e., $[Ru.xH_2O]$, $^{3+}$ wherein x refers to the number of water molecules. It is believed that the hydrated ruthenium typically has a chemical formula $[Ru.6H_2O]^{+3}$.

The pH of the solution containing both transition metal ion and non-complexing ion should be adjusted to as close to 7 as possible without precipitation of ruthenium as a hydrated oxide, before contacting the cationic exchange resin beads. Preferably, the solution containing the transition metal ion and the non-complexing ion has a pH of greater than or equal to about 2, more preferably greater than or equal to about 4, most preferably greater than or equal to about 7. This pH adjustment prevents hydrogen cations, $H^+$, from competing for cationic sites, i.e., associate with the negatively charge active groups, of the cationic exchange resin. For example, if a 1 Molar solution of ruthenium is used and the pH is 2, ruthenium ions will outnumber hydrogen ions by a factor of 100. Although the ratio of ruthenium ions to hydrogen ions at pH 2 is sufficient, the ratio would be even better at pH's closer to 7. Without wanting to be limited by any one theory, it is believed that upon contacting the cationic exchange resin beads with the transition metal salt solutions, the positively charged transition metal ions exchange with the positive ions initially associated with the negatively charged active groups of the cationic exchange resin.

To ensure high displacements of the transition metal ions without using excessive quantities of transition metal salt solutions, the exchange can be performed by contacting the cationic exchange beads with transition metal salt solutions in a tube or column. this method can also be used to treat the previously-described anionic exchange resins. The tube or column is usually mounted vertically and filled with cationic exchange beads. The solution containing transition metal ions and non-complexing ions is allowed to pass through the column of beads. Typically, more dilute solutions are used first and then progressively more concentrated solutions can be used thereafter, thereby allowing the use of the concentrated solutions from the end of prior batches at the beginning of subsequent batches. Large quantities of catalyst treated cationic resin beads can be produced by utilizing a continuous counter-current system that allows virtually complete utilization of ruthenium and complete saturation of the beads. A continuous counter-current system means contacting the more dilute ruthenium solution with the less treated beads and the more concentrated ruthenium solution with the more treated beads. After exchanging the transition metals onto and/or into the beads, the cationic exchange resins are rinsed with deionized water and then reacted with a solution containing a reducing agent, such as sodium borohydride, to reduce the ruthenium to it neutral valence state. Higher transition metal content can be obtained by repeating the exchange and/or reduction steps, because the reduction step restores cations at the negatively charged active groups of the exchange resin. It is believed that the restored cation associated with the active group is provided by the reducing agent, i.e., sodium from the sodium borohydride. After rinsing with water, the treated cationic exchange resin beads are ready for use as a catalyst in the reaction of the metal hydride and water to produce hydrogen gas.

Thus, the present invention provides for a hydrogen generation system which provides for a compact and efficient construction of a hydrogen generator. Although the present invention has been described in connection with specific exemplary embodiments, it should be understood that various changes, substitutions and alterations can be made to the disclosed embodiments without departing from the spirit and scope of the invention as set forth in the appended claims.

We claim:

1. A hydrogen generator system comprising:
    a first container, said first container having at least one side;
    a second container, said second container having at least one side;
    a catalyst system, said catalyst system being in fluid communication with said first container and said second container;
    a pumping system, said pumping system being in fluid communication with said catalyst system;
    wherein at least a portion of said at least one side of said first container is shared with at least a portion of said at least one side of said second container thereby defining a shared partition, and
    wherein at least a portion of said shared partition is flexible.

2. The hydrogen generator system according to claim 1, wherein said flexible portion of said shared partition includes folding portions.

3. The hydrogen generator system according to claim 1, wherein said flexible portion of said shared partition includes telescoping portions.

4. The hydrogen generator system according to claim 1, wherein said first container is a fuel container and said second container is a spent fuel container.

5. The hydrogen generator system according to claim 4, further comprising a pressure switch, said pressure switch being in fluid communication with said spent fuel container and in communication with said pumping system.

6. The hydrogen generator system according to claim 4, further comprising a hydrogen container in fluid communication with said spent fuel container.

7. The hydrogen generator system according to claim 1, further comprising a hydrogen container, said hydrogen container being in fluid communication with said catalyst chamber.

8. The hydrogen generator system according to claim 1, wherein said catalyst chamber has a hydrogen generator catalyst for reacting with a hydride solution to create hydrogen.

9. The hydrogen generator system according to claim 8, wherein said hydride solution is a metal hydride solution.

10. The hydrogen generator system according to claim 9, wherein said metal hydride solution is a sodium borohydride solution.

11. A hydrogen generator system comprising:
    a first container, said first container having at least one side;
    a second container, said second container having at least one side, wherein said second container is contained at least partially within said first container, and wherein at least a portion of said at least one side of said second container is outside said first container, thereby defining an outside portion;
    a catalyst system, said catalyst system being in fluid communication with said first container and said second container;

a pumping system, said pumping system being in fluid communication with said catalyst system; and a spent fuel line, said spent fuel line being in fluid communication with said catalyst system and at least a portion of said spent fuel line being wrapped around at least a portion of said outside portion of said second container.

12. The hydrogen generator system according to claim 11, wherein said first container has a first perimeter and said second container has a second perimeter, and said second perimeter being less than said first perimeter whereby said spent fuel line being wrapped around said outside portion of said second container does not extend beyond said first perimeter.

13. The hydrogen generator system according to claim 11, further comprising an insulated area covering at least a portion of said outer surface area and interposed as least between said outside portion of said second container and at least a portion of said spent fuel line.

14. The hydrogen generator system according to claim 11, wherein said first container is a fuel container, said second container is a spent fuel container and said spent fuel line is in fluid communication with said spent fuel container.

15. The hydrogen generator system according to claim 11, wherein said second container is a fuel container, said first container is a spent fuel container and said spent fuel line is in fluid communication with said spent fuel container.

16. The hydrogen generator system according to claim 14, further comprising a pressure switch, said pressure switch being in fluid communication with said spent fuel container and in communication with said pumping system.

17. The hydrogen generator system according to claim 11, further comprising a hydrogen container in fluid communication with said spent fuel container.

18. The hydrogen generator system according to claim 11, further comprising a hydrogen container, said hydrogen container being in fluid communication with said catalyst chamber.

19. The hydrogen generator system according to claim 11, wherein said catalyst chamber has a hydrogen generator catalyst for reacting with a hydride solution to create hydrogen.

20. The hydrogen generator system according to claim 17, wherein said hydride solution is a metal hydride solution.

21. The hydrogen generator system according to claim 18, wherein said metal hydride solution is a sodium borohydride solution.

22. A hydrogen generator system comprising:

a first container;

a second container;

a catalyst system, said catalyst system being in fluid communication with said first container and said second container;

a pumping system, said pumping system being in fluid communication with said catalyst system; and a spent fuel line, said spent fuel line being in fluid communication with said catalyst system and at least a portion of said spent fuel line being wrapped around at least a portion of said outside portion of said second container, wherein said catalyst system and said pumping system are disposed between said first container and said second container.

23. The hydrogen generator system according to claim 22 further comprising a transportation cart having a frame, a back, at least one support band and a plurality of wheels, wherein said back and said at least one support band support said first container and said second container.

24. The hydrogen generator system according to claim 22 wherein said back is comprised or a plurality of support struts and a plurality of vertical braces.

25. Apparatus for use in a system for generating hydrogen, said apparatus comprising a first container containing a reactant material capable of generating hydrogen and a spent material, said first container also having an exit port which provides said reactant material; and a second container configured to receive said hydrogen and said spent material generated by said reactant material, said first and second containers sharing a common portion and wherein said common portion responds to reactant material exiting through said exit port so as to decrease the volume of said first container and increase the volume of said second container, and said second container having an output port configured to output said hydrogen.

26. The apparatus of claim 25 wherein said portion is fabricated so as facilitate its collapse.

27. The apparatus of claim 25 wherein said portion includes folding portions.

28. The apparatus of claim 25 wherein said portion includes telescoping portions.

29. The apparatus of claim 25 wherein said reactant material is a hydride solution.

30. The apparatus of claim 25 wherein said reactant material is a stabilized metal hydride solution.

31. The apparatus of claim 25 wherein said reactant material comprises sodium borohydride.

32. The apparatus of claim 25 wherein said second container surrounds a predetermined portion of said first container.

33. The apparatus of claim 25 wherein said second container include heat fins.

34. The apparatus of claim 25 wherein said output port is configured to inhibit the exiting of spent material.

35. A method for use in a system for generating hydrogen, said method comprising the steps of providing a first container containing a reactant material capable of generating hydrogen and a spent material, said first container also having an exit port which provides said reactant material; and providing a second container configured to receive said hydrogen and said spent material generated by said reactant material, said first and second containers sharing a common portion and wherein said common portion responds to reactant material exiting through said exit port so as to decrease the volume of said first container and increase the volume of said second container, and said second container having an output port configured to output said hydrogen.

* * * * *